April 21, 1936.  W. E. SLOAN  2,038,135

FLUSH VALVE

Filed Feb. 5, 1931

Inventor
William E. Sloan
By Parker & Carter Attys.

Patented Apr. 21, 1936

2,038,135

UNITED STATES PATENT OFFICE 2,038,135

FLUSH VALVE

William E. Sloan, Chicago, Ill.

Application February 5, 1931, Serial No. 513,530

6 Claims. (Cl. 137—93)

REISSUED

This invention relates to flush valves and has for its object to provide a new and improved device of this description. The invention has as a further object to provide a flush valve with means for adjusting it so as to vary the amount of water passing therethrough at any given operation, the adjustment being made from the outside and the variation in the quantity of water being due to variations in travel of the main valve, and particularly to provide such an adjustment with a non-hold open flush valve. Other objects are more particularly pointed out in the accompanying description.

Referring now to the drawing, Fig. 1 is a vertical sectional view through one form of valve embodying the invention;

Like numerals refer to like parts throughout the several figures.

Figure 1:
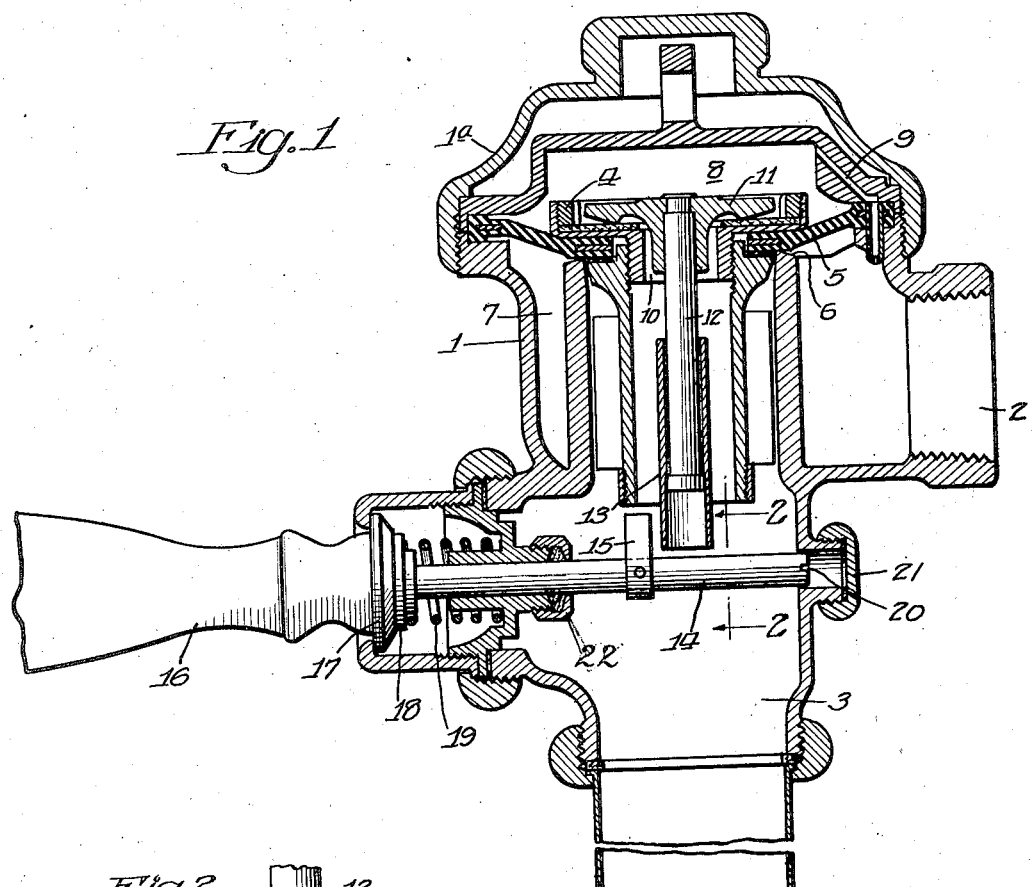
Figure 2:
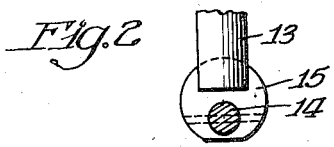
Fig. 2 is a sectional view taken on line 2—2 of Fig. 1.
Figure 3:
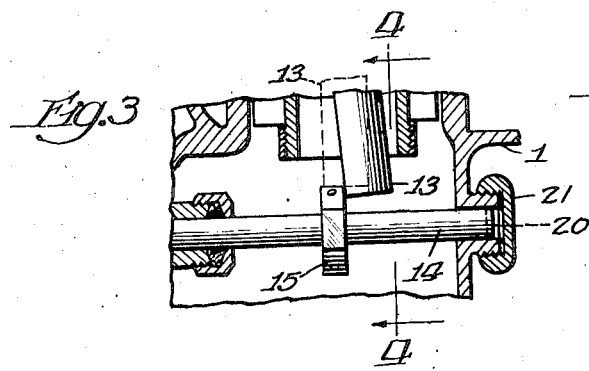
Fig. 3 is a sectional view with parts omitted showing the adjustable actuating device in a different position from that shown in Fig. 1.
Figure 4:
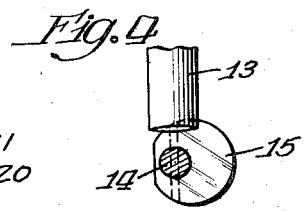
Fig. 4 is a sectional view taken on line 4—4 of Fig. 3.

In the drawing, for purposes of illustration, I have shown a diaphragm flush valve, that is a flush valve where the main valve is connected with the diaphragm, but the invention is equally applicable to other forms of flush valves, such as piston flush valves. In the construction shown the valve is provided with a casing made up of the sections 1 and 1a, having an inlet 2 and an outlet 3. Within the casing is a main valve 4 which in this instance is connected with the diaphragm 5, the main valve seating on the seat 6. The main valve divides the interior of the casing into two chambers, the chamber 7 and the chamber 8. A by-pass 9, preferably of small cross sectional area, connects the two chambers. The main valve is provided with a passageway 10 which connects the chamber 8 with the discharge 3 and which is controlled by the auxiliary valve 11 carried by the main valve. This auxiliary valve is provided with a stem consisting of the telescoping members 12 and 13. The auxiliary valve is opened by moving the stem laterally. In the construction herein shown this is accomplished by means of an actuating device 14 which carries an adjustable actuating member or plunger 15. The actuating device 14 is moved laterally by a handle 16. This handle has an enlargement 17 which engages an enlargement 18 on the actuating device. When the handle is moved in any direction the actuating device is pushed inwardly. A retracting spring 19 moves the parts to their initial position when the handle is released. When the handle is moved and the actuating device 14 moved inwardly, the adjustable actuating member 15 engages the member 13 of the valve stem and moves it laterally, thus opening the auxiliary valve 11. The adjustable actuating member 15 is adjustable so that the length of the part thereof which projects about the actuating device may be varied. Any suitable means for adjusting this member may be used, and I prefer to arrange some means by which it is adjusted from the exterior of the valve. In the particular construction illustrated, the adjustable actuating member or plunger 15 is shown as an eccentric fastened to the actuating device 14. The end of the actuating device 14 is provided with a notch 20 for the insertion of a tool by means of which it may be rotated. This end with the notch is accessible from the exterior of the valve by simply removing the cap 21. It will be seen that when the actuating device 14 is rotated the position of the eccentric or plunger will be varied so as to shift the vertical position of the plunger, that is to vary the length thereof which projects above the lower end of the stem member 13. Figs. 1 and 2, for example, show the parts in the adjusted position where the maximum length of the adjustable actuating member 15 projects above the actuating device 14. Figs. 3 and 4 show the parts adjusted so that a lesser length of the adjustable actuating member projects above the actuating device.

The use and operation of my invention are as follows:

When the parts are in the position shown in Fig. 1 the valve is closed. When it is desired to operate the valve the handle 16 is moved in any direction. This causes the actuating device 14 to be moved inwardly and the actuating member or plunger 15 thereon strikes the member 13 of the valve stem of the valve 11 and moves it laterally. This opens the auxiliary valve. Water then passes from the chamber 8 out through the passageway 10 and the outlet 3. The pressure of the water in chamber 7 then causes the main valve to be lifted and the water passes from the inlet 2 through the main valve and the seat 6 and out through the outlet 3.

When the main valve is lifted, so that the part 13 of the stem of the auxiliary valve rises above the top of the adjustable actuating member or plunger 15, this member returns to its vertical position and the auxiliary valve is closed. Water passing through the by-pass 9 then enters the chamber 8 and the pressure will equalize so that the main valve descends. If, now, the handle has been held in its operative position, the member 13 strikes the top of the adjustable actuating member or plunger 15 and slides along the member 12, thus permitting the main valve to close.

It will be seen that the auxiliary valve is held open as long as the actuating member or plunger engages the member 13. After this actuating member is adjusted so as to shift its vertical position so that the maximum amount projects above the lower end of the auxiliary valve stem, the auxiliary valve will be held open the maximum length of time. When this actuating member or plunger is adjusted to project a shorter length or distance above the lower end of the auxiliary valve stem, the auxiliary valve will be held open a shorter time. The longer the auxiliary valve is held open the greater will be the distance of the upward travel of the main valve and the greater will be the amount of water passing through the valve, and as the time it is held open is decreased the upward travel of the main valve decreases, thus decreasing the amount of water passing through the valve.

It will be seen that by this arrangement the parts may be adjusted from the exterior of the valve so as to vary the amount of water passing through the valve at any given operation, that this adjustment varies the travel of the main valve, and that its action is effective when the actuating handle 16 is held in its operative position, that is with the non-hold open flush valve construction.

Some means is provided for preventing the actuating device 14 from being accidentally turned by the handle 16. This is accomplished by means of a packing gland 22 which is tightened sufficiently to compress the packing to prevent the accidental rotation of the actuating device 14.

I claim:

1. A flush valve comprising a casing provided with an inlet and an outlet, a main valve therein dividing the casing into two chambers, an upper chamber and a lower chamber, said main valve being provided with a passageway which connects the upper chamber with the outlet, an auxiliary valve carried by the main valve and controlling said passageway therethrough, a stem for said auxiliary valve, a rod mounted in proximity to the end of said stem, means for moving said rod, an actuating member connected with said rod intermediate its ends and adapted to engage said stem when the rod is moved so as to open the auxiliary valve and hold it open a predetermined length of time, and means for adjusting the position of said actuating member so as to vary the length of time it engages said stem to hold said auxiliary valve open.

2. A flush valve comprising a casing provided with an inlet and an outlet, a main valve therein dividing the casing into two chambers, an upper chamber and a lower chamber, said main valve being provided with a passageway which connects the upper chamber with the outlet, an auxiliary valve carried by the main valve and controlling said passageway therethrough, a stem for said auxiliary valve, a rod mounted in proximity to the end of said stem, means including a handle for moving said rod, an actuating member connected with said rod and adapted to engage said stem when the rod is moved so as to open the auxiliary valve and hold it open a predetermined length of time, and means accessible while the handle is in its operative position for adjusting the position of said actuating member so as to vary the length of time it engages said stem to hold said auxiliary valve open, and means for preventing the auxiliary valve from being held open when said actuating member is held in its operative position.

3. A flush valve comprising a casing having an inlet and an outlet, a main valve dividing the casing into two chambers, an upper chamber and a lower chamber, said main valve having a passageway therethrough connecting the upper chamber with the outlet, an auxiliary valve carried upon said main valve and controlling said passageway, an actuating mechanism including a handle movably mounted on said casing for opening said auxiliary valve, and means accessible from the opposite side of the casing on which said handle is mounted for adjusting said actuating mechanism so as to vary the length of time the auxiliary valve is held open in any given cycle of operation of the flush valve.

4. A flush valve comprising a casing having an inlet and an outlet, a main valve dividing the casing into two chambers, an upper chamber and a lower chamber, said main valve having a passageway therethrough connecting the upper chamber with the outlet, an auxiliary valve carried upon said main valve and controlling said passageway, an actuating mechanism including a handle movably mounted on said casing for opening said auxiliary valve, and means accessible from the opposite side of the casing on which said handle is mounted for adjusting said actuating mechanism so as to vary the length of time the auxiliary valve is held open in any given cycle of operation of the flush valve, and means for insuring the closing of said auxiliary valve when the actuating mechanism is held in its operative position so as to insure the closing of the main valve.

5. A flush valve comprising a casing having an inlet and an outlet, a main valve dividing the casing into two chambers, an upper chamber and a lower chamber, said main valve having a passageway therethrough connecting the upper chamber with the outlet, an auxiliary valve carried upon said main valve and controlling said passageway, an actuating mechanism for opening said auxiliary valve, said actuating mechanism comprising a rod rockably mounted in the casing and extending across said outlet and having bearings on opposite sides of the casing, means for moving the rod longitudinally, an actuating member carried by said rod between its ends which engages said stem when the rod is moved longitudinally, said actuating member projecting at varying distances from the rod at different points around the rod, and means for rotating the rod to vary the length of the portion of the actuating member that engages said stem.

6. A flush valve comprising a casing having an inlet and an outlet, a main valve dividing the casing into two chambers, an upper chamber and a lower chamber, said main valve having a passageway therethrough connecting the upper chamber with the outlet, an auxiliary valve carried upon said main valve and controlling said passageway, an actuating mechanism for opening said auxiliary valve, said actuating mechanism comprising a rod rockably mounted in the casing, a handle for moving the rod longitudinally, an actuating member carried by said rod which engages said stem when the rod is moved longitudinally, said actuating member projecting at varying distances from the rod at different points around the rod, and means for rotating the rod to vary the length of the portion of the actuating member that engages said stem, said means accessible from the exterior of the casing while the handle is in its operative position.

WILLIAM E. SLOAN.